United States Patent [19]

Robinson et al.

[11] Patent Number: 4,748,439
[45] Date of Patent: May 31, 1988

[54] MEMORY APPARATUS AND METHOD FOR RETRIEVING SEQUENCES OF SYMBOLS INCLUDING VARIABLE ELEMENTS

[75] Inventors: Ian N. Robinson, Mountain View, Calif.; Erik L. Brunvand, Pittsburgh, Pa.; Alan L. Davis, Half Moon Bay, Calif.

[73] Assignee: Fairchild Semiconductor Corporation, Palo Alto, Calif.

[21] Appl. No.: 765,387

[22] Filed: Aug. 13, 1985

[51] Int. Cl.[4] .............................................. G06F 7/20
[52] U.S. Cl. .................................. 340/146.2; 364/900
[58] Field of Search ... 364/200 MS File, 900 MS File, 364/728; 340/146.2

[56] References Cited

U.S. PATENT DOCUMENTS

| | | |
|---|---|---|
| 3,245,052 | 4/1966 | Lewin . |
| 3,358,270 | 12/1967 | Crew et al. ........................ 364/900 |
| 3,701,980 | 10/1972 | Mundy . |
| 3,906,455 | 9/1975 | Houston et al. .................... 364/200 |
| 4,027,288 | 5/1977 | Barton et al. ....................... 364/900 |
| 4,053,871 | 10/1977 | Vidalin et al. ..................... 364/900 |
| 4,390,945 | 6/1983 | Olsen et al. ........................ 364/900 |
| 4,451,901 | 5/1984 | Wolfe et al. ....................... 364/900 |

Primary Examiner—Eddie P. Chan
Attorney, Agent, or Firm—Fitch, Even, Tabin & Flannery

[57] ABSTRACT

A memory system and method for the storage and retrieval of sequences of symbols which may be used to represent rules in artificial intelligence systems. The stored data sequence consist of a plurality of symbols, each symbol belonging to one of three classes, constants, variables, or delimiters. Stored data sequences are retrieved by the apparatus of the present invention in response to a query sequence which consists of a plurality of symbols belonging to the same three classes as the symbols comprising the stored data sequences. A stored data sequence is retrieved in response to a given query sequence if the two sequences can be made identical by replacing each variable element appearing in the two sequences by a constant or a combination of constants and delimiters, said combination beginning and ending with a delimiter. Different constants or combinations thereof may be used for each variable element replaced. The apparatus consists of a memory, a means for receiving a query sequence coupled to the apparatus, and a data processing system for comparing the query sequence with each of the stored data sequences and retrieving those data sequences which correspond to the query sequence. The data processing system may be structured so as to contain a plurality of processors working in parallel, each of which operating on a different group of stored data sequence symbols so as to decrease the time needed to find the data sequences corresponding to a given query sequence.

18 Claims, 5 Drawing Sheets

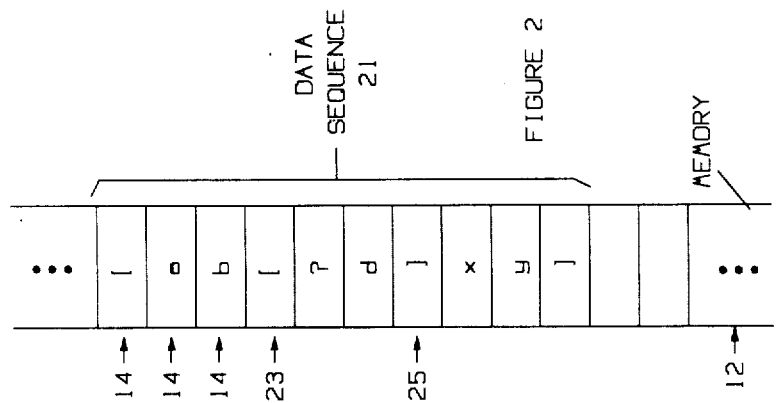
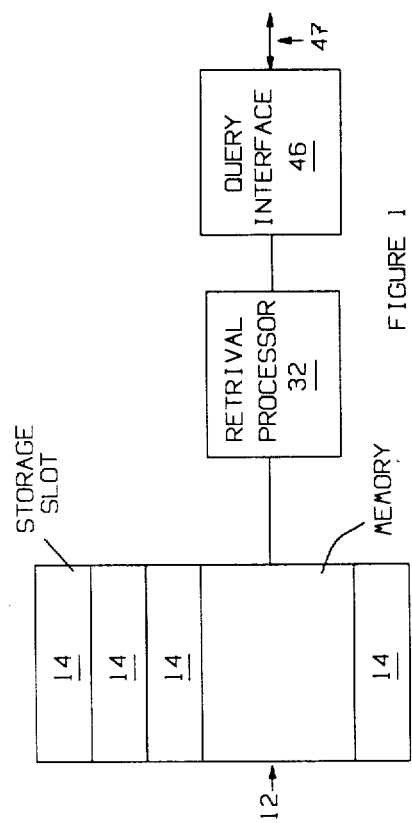

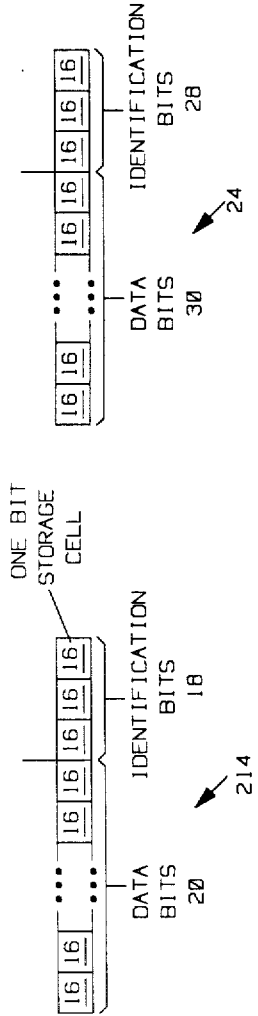
FIGURE 3(a)
FIGURE 3(b)
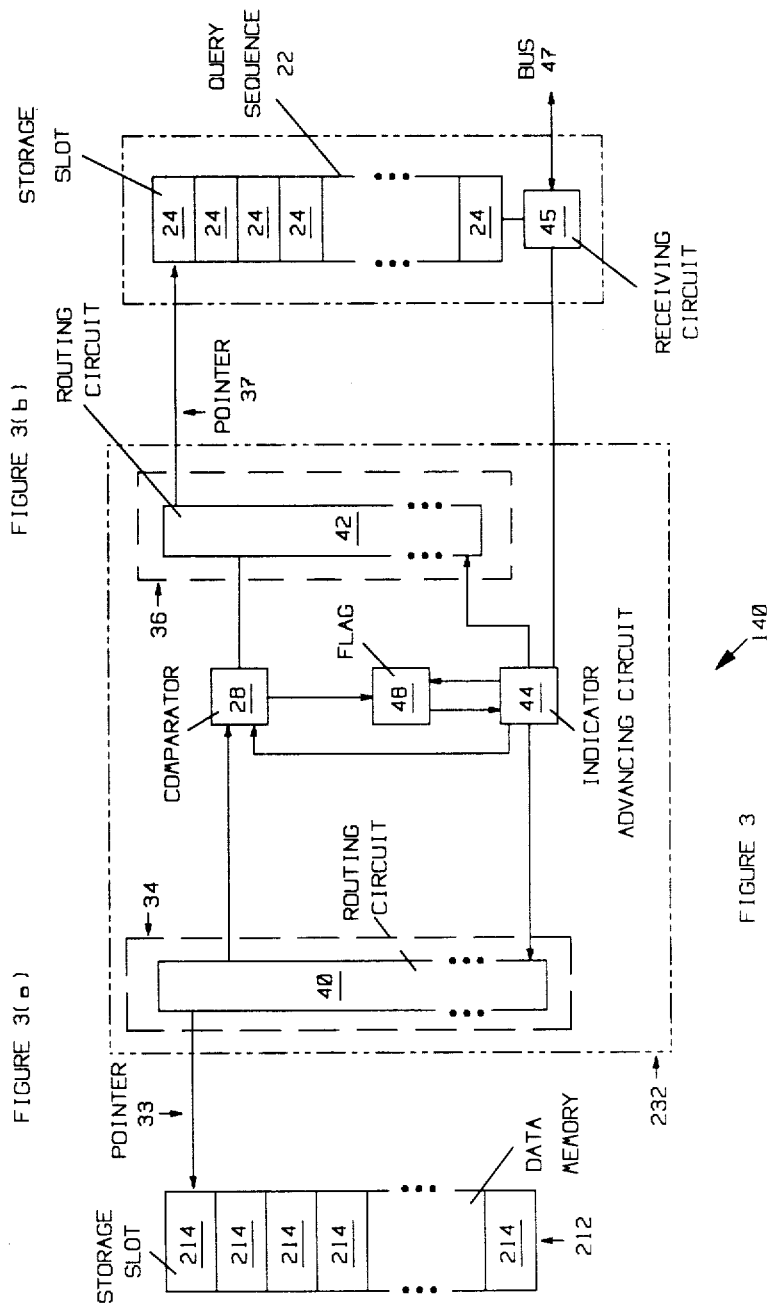
FIGURE 3

MEMORY APPARATUS AND METHOD FOR RETRIEVING SEQUENCES OF SYMBOLS INCLUDING VARIABLE ELEMENTS

BACKGROUND OF THE INVENTION

The present invention is directed generally to the field of data processing systems and more particularly to memory systems for use in data processing systems.

Essentially all data processing systems used in artificial intelligence systems require that information be stored and selectively retrieved. The information is normally organized as a database, stored in a memory, which consists of a number of records which are to be retrieved one at a time. Normally, each record is retrieved as a unit. The simplest example of a database retrieval involves retrieving all records that contain one or more keywords. For example, the database might consist of all the articles in a particular set of scientific journals, one article per record. Here one would like to retrieve all articles containing one or more keywords, such as all records containing the words "computing" and "artificial intelligence".

In "expert systems" the database is codified into rules which must be searched repeatedly for rules conforming to a given specification or "query sequence". This type of search, referred to as a "rule-based" search, differs significantly from the search for records containing one or more keywords described above. In a rule-based search the system must choose which of the many rules in the database to apply next to the problem at hand. This choice will depend on the data and relationships between the variables in the problem being solved. The expert system system must select those rules which contain the same data and/or relationships between the variables. A keyword search requires only that the system select rules which contain the same data. For example, these rules may be of the form:

If <condition> then <action or conclusion>.
One of the rules in the data base might be as follows:
if (x eats) then (x is hungry).

If the problem contains the information "Peter eats", the system would be faced with the task of searching all the rules for one containing (x eats). Here x is a variable element which may be replaced by any element in the known information. The above rule together with any others involving "eats" would be retrieved. Once the system has retrieved the rule, it substitutes Peter for x and then concludes that Peter is hungry.

The rule-based search differs significantly from the simple keyword or key element search wherein all records containing one or more keywords are retrieved. In a rule-based system, both the number and order of the elements in the database records are important. Consider a database containing the three records (a,x,b), (a,z,b), and (b,(d,e),a). A request for all records containing "a" and "b" would retrieve all of the above records. However, a request for all "rules" of the form (a,b) would not be satisfied by any of the records, since each record contains 3 elements and the requested rule contains only two. A request for all rules of the form (a,?,b), where ? denotes a variable element which may be satisfied by any constant, a sub-expression, or another variable, would retrieve the first two records, but not the third, since "a" and "b" appear in the wrong order in the third record. Hence even with the concept of a variable, a rule-based retrieval system cannot conveniently be used to select records based on the key elements in an unspecified order.

Similarly, a keyword retrieval system is not well suited to the rule-based retrieval problem since it would retrieve many records in which the elements appear in the wrong order or are present with undesired additional elements. These extra records would have to be discarded by the system after they have been retrieved, which requires both processing time and additional memory for storing the undesired rules.

One problem encountered in implementing artificial intelligence systems using presently available computer hardware is the time required to search a large database for records matching a particular query sequence. To be useful, such a system must contain a very large number of records. Since the time needed to search the database is proportional to the length of the database, as a system having a fixed searching speed becomes "smarter" through the addition of new information in the form of new rules, it also become slower. This problem can only be solved by increasing the searching speed of the system as the size of the database to be searched is increased.

In spite of the numerous improvements which have been made in integrated circuit technology, modern computers differ very little from the original Von Neumann designs. The classical Von Neumann machine consists of a central processing unit and a separate memory organized into words of fixed length. The processing unit fetches data from the memory, one word at a time by specifying the location of the desired word, i.e., its address, relative to the beginning of the memory. To perform the above search, a Von Neumann type central processing unit would sequentially retrieve each word of the database from the memory and would then compare it to each of the keywords in the query sequence which are also stored in the memory.

Since there is a limit to the speed at which a single processing unit can run, Von Neumann type machines in practice are limited as to the size of the database that may be accessed. Even at speeds of 10 million compares per second, a Von Neumann machine would be hard pressed to search the contents of a library which contained, for example, only the law reporter series for the various jurisdictions in the United States.

In addition to its speed limitations, the Von Neumann type architecture also presents a number of limitations because of its inherent hardware dependence. In order to specify a memory address, a fixed number of address lines are used. A system with N address lines can address a memory of $2^N$ words and no more. To increase the memory capacity beyond this limit, one must increase the number of address lines. This involves both hardware and software alterations, since most systems specify a maximum memory size that the computer's instruction set is capable of addressing. Furthermore, if a portion of the memory is rendered inoperative by a malfunction of one of its components, it is difficult to transfer this storage to an undamaged segment of memory without reprogramming. As the size of the memory is increased in response to the need to store increased numbers of data records, the probability of such a malfunction in one component of the memory increases.

Finally, a large database search problem will require the use of only a small fraction of the instructions present in the central processing unit. A typical central processing unit has literally hundreds of instructions that it is capable of executing varying from input/output instruction for dealing with the outside world to mathematics instructions for combining memory words which represent numbers. The database search problem requires at most 10 to 20 of these instructions. Hence the database search problem under-utilizes the instruction repertoire of the typical central processing unit.

The speed limitations of the central procession unit may be overcome to some degree by constructing a system having multiple central procession units each having access to the memory. However, this solution has its limitations. The number of central processing units that can share a given memory is ultimately limited by the time it takes each central processing unit to access the memory. If the memory bus must be dedicated to each central processing unit for 1/10th of the time, then no more than 10 central processing units can effectively share the same memory. Thus, replicating the central processing unit is not the best solution to the speed limitations of Von Neumann machines.

Even if one could effectively reduce the search time using replicated central processing units, one is still left with the limitations imposed by the hardware. Sooner or later one will want to expand the database beyond these hardware limitations, which is difficult to do in the Von Neumann type machines.

Ideally, one would like to have a modular memory which could be added to a system whenever increases in the size of the database demand it without the concomitant necessity of increasing the number of address lines. This ability to expand the memory will become increasingly more important in those artificial intelligence systems where one seeks to build a machine which is capable of acquiring and using ever increasing amounts of information.

SUMMARY OF THE INVENTION

The present invention consists of a memory system for storage and retrieval of sequences of symbols which may be used to represent rules in artificial intelligence systems. The stored data sequences consist of a plurality of symbols, each symbol belonging to one of three classes, constants, variables, or delimiters. Stored data sequences are retrieved by the apparatus of the present invention in response to a query sequence which consists of a plurality of symbols belonging to the same three classes as the symbols comprising the stored data sequences. A stored data sequence is retrieved in response to a given query sequence if the two sequences can be made identical by replacing each variable element appearing in the two sequences by a constant or a combination of constants and delimiters, said combination beginning and ending with a delimiter. Different constants or combinations thereof may be used for each variable element replaced. The apparatus consists of a memory, a means for receiving a query sequence coupled to the apparatus, and a data processing system for comparing the query sequence with each of the stored data sequences and retrieving those data sequences which correspond to the query sequence. The data processing system may be structured so as to contain a plurality of processors working in parallel, each of which operating on a different group of stored data sequence symbols so as to decrease the time needed to find the data sequences corresponding to a given query sequence.

It is therefore an object of the present invention to provide an improved memory system for the storage and retrieval of rules applicable to rule-based artificial intelligence systems.

It is a further object of the present invention to reduce the time needed to retrieve these rules by employing processing operations in parallel.

These and other objects of the invention will become clear from the following detailed description of the invention and the accompanying drawings.

BRIEF DESCRIPTION OF THE DRAWINGS

FIG. 1 is a schematic block diagram of a memory system according to the present invention.

FIG. 2 illustrates an exemplary allocation of memory to store a data sequence in the memory system shown in FIG. 1.

FIGS. 3(*a*) and 3(*b*) illustrate a block diagram of a memory system according to the present invention in which the query sequence is also stored in the apparatus of the present invention.

DETAILED DESCRIPTION OF THE INVENTION

Figure 4:
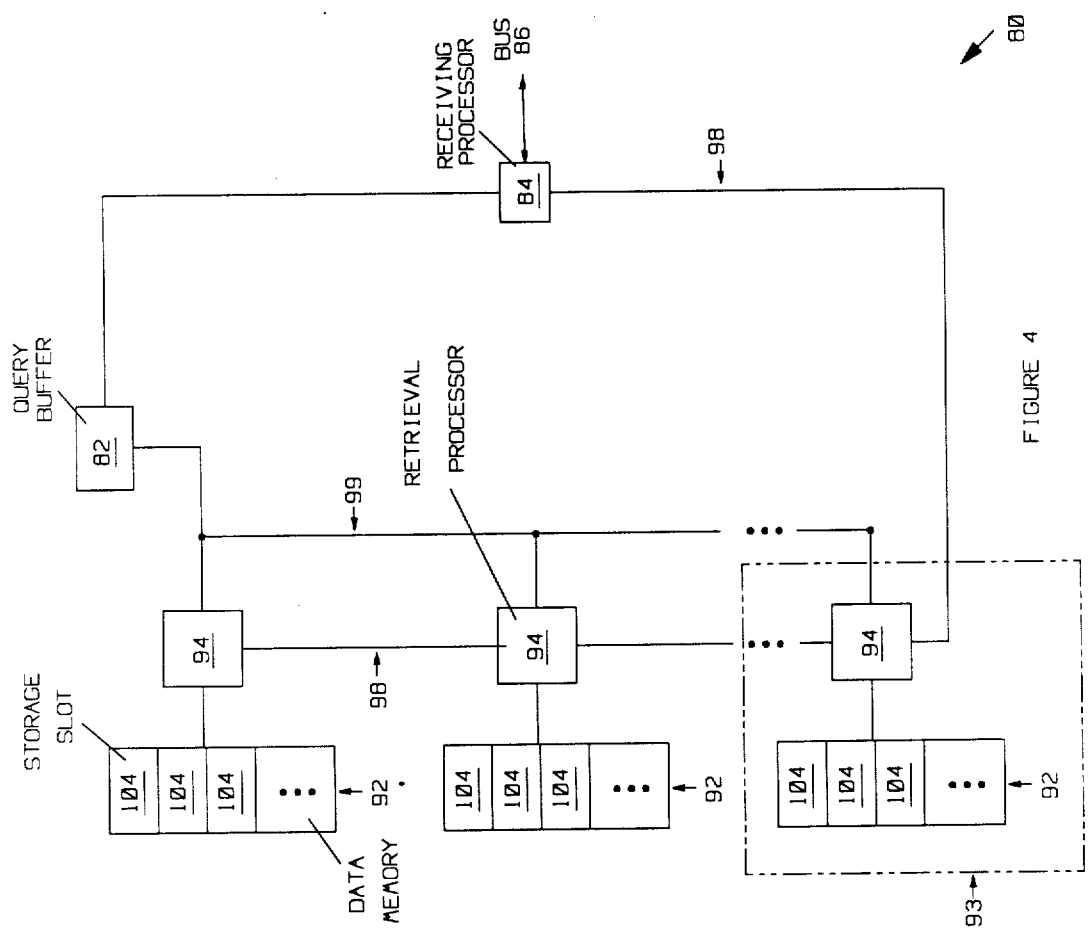
FIG. 4 is a block diagram of a second embodiment of the present invention.

According to the present invention, a rule is stored in the form of a string of symbols which may contain three types of elements, delimiters, constants and variables. Delimiters, denoted by "("and")", are used to mark the boundary of data sequences and sub-expressions within data sequences. The string (a,b,(f,g),c) represents a data sequence having "a" as the first element, "b" as the second, the combination "f,g" as the third element and "c" as the fourth. Constants are elements having fixed values, e.g., "eats" and "hungry" in the above problem. A request for (a,b,c) can only be satisfied if all three of the constants a, b, and c are present in the order shown with no other elements between them. Variables, denoted by "?" or by "?x", where x is an optional name, may be satisfied by any constant or another variable or combination of constants and variables enclosed by a pair of delimiters. They constitute a shorthand for "match anything". Thus a request to find all data sequences of the form (a,?,b) would return (a,x,b), (a,?,b), (a,z,b), (a,(d,e),b), etc.

In the above example, the memory would be searched for rules of the form "(if, (?x, eats), then, (?x, is, ?y))". A request for all data sequences of the form "(if, ?, then, ?)" would retrieve all "if-then" data sequences including the one listed above.

Since in conventional systems the search time is proportional to the length of the database being searched, the search time may be reduced by breaking the memory that stores the database into several subunits, each with its own processing unit. This is equivalent to dividing the search task between a number of small Von Neumann machines, each with sufficient memory to hold the relevant part of the query sequence and one or more data sequences. The fastest search with such a system would be realized with a memory which has one processing unit built into each word of memory. Then in one memory cycle, the memory could compare itself to a query symbol and identify each data sequence in which the query symbol appeared. The optimum ratio of database words to processing units will clearly depend on the complexity of the processing unit relative to that of the memory. Since the processing unit needs only a few instructions to carry out the search function, it can have a much simpler construction than a general purpose central processing unit. Consequently a relatively high density of processing units is possible. This type of highly replicated modular structure is particularly well suited to modern VLSI integrated circuit fabrication techniques.

This type of replicated computer hardware is also well suited to the database search problem in that the processing time does not increase as the database size increases, since each unit of memory capacity carries its own searching capacity with it in the form of its built-in processing unit. Hence the computing capacity of the system expands as the database expands. Furthermore, the system's central procession unit, as opposed to that of the processing units which provide the search function in memory, has relatively little overhead in this type of design. It does not need to keep track of addresses or other data associated with the contents of the memory. It has only to send the query sequence to a memory unit made up of a number of modules with instructions as to where to store the results of the search.

A block diagram of an apparatus according to the present invention is shown schematically at 10 in FIG. 1. Broadly, it consists of a memory means 12, connected to a retrieving means 32, and receiving means 46 for coupling a query sequence to the apparatus and reading out the specified data sequences on a bus 47 which connects the apparatus of the present invention to an external data processing system. The memory is divided into slots 14. Each slot is used to store one of the symbols comprising the data sequences of symbols which are to be retrieved in response to a query sequence of symbols communicated on the communication bus. A typical data sequence of symbols stored in memory means 12 is shown at 21 in FIG. 2. It consists of three types of symbols, constants, delimiters, and variables. Constants are denoted by letters of the alphabet, variables by "?" and delimiters by "("and")". All data sequences begin and end with a delimiter. Other embodiments in which data sequences begin and end with other "special" symbols or in which information specifying the end of the data sequence is encoded in a special symbol preceding the end of the data sequence, will be obvious to those skilled in the art of data processing systems. A data sequence may also contain subsequences of symbols embedded within the data sequence. Such subsequences also begin and end with delimiters. The subsequence beginning at 23 and ending at 25 in FIG. 2 is typical of such subsequences.

Referring again to FIG. 1, the retrieving means 32 retrieves all stored data sequences which correspond to the query sequence coupled to it on the communication bus 47. A data sequence is defined as corresponding to a given query sequence if the two sequences can be made identical by replacing each variable with a constant or a combination of constants, said combination of constants beginning and ending with a delimiter. The constant or combination of constants will, in general, be different for each variable replaced. For example, the data sequence (a,?,d,e,(k,l),e)

may be made identical to the query sequence (a,f,d,e,?,e)

by replacing the variable in the data sequence with the constant "f" and the variable in the query sequence with the combination (k,l), i.e., a combination of constants beginning and ending with a delimiter.

A search for all data sequences corresponding to a given query sequence requires three steps. First, the apparatus must be initialized for the search. This involves the setting of certain indicators described below. Second, the query sequence to be used must be communicated to the retrieving means 32 via the receiving means 46. The retrieving means 32 then performs a number of pair-wise comparisons between symbols in the query sequence and symbols in the stored data sequences. Finally, those data sequences which corresponded to the query sequence are read out over the communication bus 47 by the receiving means 46. The exact order of these steps varies depending on the specific embodiment of the apparatus of the present invention, as will be described below.

The memory means 12 used in the preferred embodiment of the present invention can be either a read only memory or a read/write memory. In systems in which the database represented by the stored data sequences is not updated, a read only memory would be preferable, since such a memory would be less likely to accumulate errors from noise or other sources. In systems which change the database stored in the apparatus of the present invention in response to the particular problem presented to an external data processing system, a memory which may be easily reprogrammed is preferred. In the preferred embodiment, this reprogramming may be initiated by sending one or more special purpose query sequence symbols to the retrieving means 32, followed by one or more data sequences to be stored in the memory. Other memory means which may be selectively reprogrammed, such as electrically erasable programmable read only memories, will be obvious to those skilled in the art of data processing hardware.

An apparatus according to the present invention which does not involve parallel processing is shown at 140 in FIG. 3. Broadly, it consists of a memory means 212 for storing the data sequences of symbols, a retrieving means 232 for carrying out the operations necessary to retrieve said data sequences of symbols, and a receiving means 246 for coupling a query sequence to the apparatus. In this embodiment, said receiving means 246 contains a query storage memory means 22 for storing said query sequence as well as a receiving circuit 45 for coupling the apparatus to the bus 47. Embodiments not requiring this query storage memory means will be discussed below. It is assumed that the query sequence is sent to the apparatus by an external data processing system which is connected to the apparatus via the receiving means 246 on a communication bus 47 which is of conventional design.

The memory means 212 consists of a plurality of data slots 214 each of which being used to store one data symbol. In the preferred embodiment, each data slot consists of a plurality of one bit binary storage cells 16 which are divided into two groups, a data group 20 and an identification group 18, as shown in FIG. 3(a). The identification group is used to store information which specifies the type of symbol, constant, variable, or delimiter, which is stored in the slot. Since there are three types of symbols, at least two binary bits must be allocated for this purpose. The data group is used to store information relevant to the particular symbol stored in the slot.

For example, if the symbol stored in the slot was the constant "a", the identification group would contain the code for a constant and the data group would contain the code for "a". The number of possible constants is equal to $2^N$ where N is the number of bits in the data group 20. In the preferred embodiment, N is greater than 30; hence the number of different constants is greater than a billion. Therefore, a single constant may represent a word or an entire English expression, not just the letters of the alphabet used in the above examples. A system in which N was 7 would be of use for retrieving data sequences containing symbols which were letters of the alphabet coded in the standard ASCII code.

Delimiters always occur in corresponding pairs. When a slot is used to store an open delimiter, its associated data group 20 is used in the preferred embodiment to store the information needed to ascertain the location of its corresponding closing delimiter. For example, if each pair of delimiters is labeled, the label is stored in the data group 20 of the slots used to store each delimiter.

In the case of a variable, an optional name may be stored in the data group 20. Although this name is not used by the apparatus of the present invention, it is useful in making the data sequences read more like the English language. Further, such a name may be used by other higher level algorithms which make decisions based on different types of variables. In this case, the apparatus of the present invention would be used to select data sequences for use in a data processing employing this higher algorithm which would than choose a subset of those provided by the apparatus of the present invention.

As illustrated in FIG. 3, the query storage memory means 22 also comprises of a plurality of data slots, shown at 24, each of which consisting of a plurality of one bit storage cells 16 which are divided into an identification group 28 and a data group 30, as shown in FIG. 3(b). The identification group 28 contains information specifying the type of query symbol stored in the slot and the data group 30 contains information relevant to the particular symbol stored. In the preferred embodiment, the identification and data groups used for the query symbols are the same as those used for the data symbols.

The retrieving means 232 compares the query sequence stored in the query storage memory means 22 with each of the data sequences stored in memory means 212. This comparison is carried out as a series of pair-wise comparisons between a query sequence symbol and a corresponding symbol in the data sequence being compared. The first symbols to be compared are the first symbols in each said sequence. The subsequent symbols to be compared will depend on the symbols compared in the previous comparison. If the previous comparison did not involve a variable and an open delimeter, the next query sequence symbol to be compared will be the one following the query sequence symbol used in the previous comparison, and the next data sequence symbol used will be the one following the data sequence symbol used in the previous comparison.

If a variable in one sequence is compared to an open delimiter marking the beginning of a subsequence of symbols in the other sequence, the next symbols to be compared are the one following the variable and the one following the delimiter marking the end of the sub-sequence in question. This allows a variable in one sequence to be satisfied by an embedded sub-sequence of arbitrary length in the other sequence. For example, if the data sequence (a,?,x)

were compared to the query sequence (a,(k,m),y), the pairwise comparisons carried out by the retrieving means 232 would be as follows. First, the "(" in the data sequence would be compared to the "(" in the query sequence. Second the "a" in the data sequence would be compared to the "a" in the query sequence. Third, the "?" in the data sequence would be compared to the "(" in the query sequence. Since the "(" marks the beginning of the sub-sequence "k,m", the next symbols to be compared will be the "y" following the ")" in the query sequence and the x following the "?" in the data sequence.

Because of these "jumps" around sub-expressions, a first and second indicator means are required for indicating the next symbol in each sequence to use in the next pair-wise comparison between a data sequence symbol taken from that sequence and a query sequence symbol taken from the query sequence. These two indicators are required for each data sequence stored in the memory means 212 that is being actively compared to the query sequence. In the embodiment shown in FIG. 3 only one data sequence is compared at a time. Other embodiments in which a number of data sequences are compared at once will be discussed below. The preferred method of implementing these indicators will depend on the mode of storage chosen for the data sequences. Various alternatives will be discussed below.

It should be noted that a given sub-expression embedded in a data or query sequence may also contain one or more subsequences. Thus, for example, the data sequence to be compared may have the following symbols:

(a,b,(d,e,(f,g,),h,)i,)

Hence some means must be provide for ascertaining which closing delimiter, ")", marking the end of a sequence or subsequence corresponds to a given open delimiter, "(", marking the beginning of the sequence or subsequence which must be "jumped". Three means are preferred. First, a label may be associated with each pair of delimiters. For example, each pair of delimiter in the above sequence could be assigned a number, e.g. $(_0a,b,(_1d,e,(_2f,g,)_2h,i)_1k)_0$. Then when the retrieving means encounters a "(", it need only read the associated label and then search forward in the sequence in question until it encounters a ")" with the same label. For this system to operate successfully, the label used to mark a particular pair of delimiters may not be repeated within the subsequence marked by said pair of delimiters.

Second, the location of the corresponding closing delimiter may be stored with each open delimiter marking the beginning of a sequence or subsequence of symbols. The retrieving means would then "jump" to the location specified in the open delimiter. In the preferred embodiment employing this means, this location is stored as the number of symbols to skip in order to reach the next symbol after the corresponding closing delimiter. This form of encoding the location of the corresponding delimiter has two advantages. First, it is independent of the absolute location of the data or query sequence in which it is located. Hence a data sequence may be relocated in the memory without requiring that this jump location be changed. Second, the memory storage needed to store this information will in general be less than that required to store the location of said delimiter relative to some fixed point in the memory, since this jump number will be less than the maximum length of a stored data sequence. A system which used the memory location of the corresponding closing delimiter as the jump location would need to store a number with each open delimiter which is as large as the number of symbols stored in the memory means 212.

Finally, the location of the corresponding closing delimiter may be ascertained by counting the number of open and closing delimiters encountered after the open delimiter in question. For example, the retrieving means 232 could contain a counter which would be used to count the number of open and closing delimiters encountered as the retrieving means steps through the sequence containing the open delimiter one symbol at a time. The counter would be incremented each time an open delimiter was encountered and decremented each time a closing delimiter was encountered. When the counter returned to its initial state, the sub-sequence marked by the original open delimiter would have been jumped. The next symbol to use in a comparison would be the one after the closing delimiter which resulted in the counter returning to its initial value. Here, the first open delimiter must also be counted by this counter.

As mentioned above, the retrieving means 232 performs pair-wise comparisons between a query sequence symbol and a data sequence symbol. Referring again to FIG. 3, the data sequence symbol to be compared is specified by a first indicator means 34. The query sequence symbol to be used in the comparison is specified by a second indicator means 36. In the preferred embodiment, each of these indicator means 34, 6 consists of a pointer, shown at 33 and 37 respectively implemented by means of a shift register which runs along the entire length of the memory block in question. One bit in said shift register is set to "1" and the remaining bits are set to "0". The pointer is advanced by sending a shift command to this register.

The symbols indicated by said first and second indicator means are compared by a comparing means 28. The data symbol indicated by said first indicator means 34 is routed to said comparing means 28 by a first routing circuit 40 which is a part of the first indicator means 34. Similarly, the query sequence symbol indicated by said second indicator means 36 is routed to said comparing means 28 by a second routing circuit 42 which is a part of said second indicator means 36. In the preferred embodiment, the routing circuits 40 and 42 are conventional multiplexing circuits.

The comparing means 28 generates an output signal which has two alternative states, "matched" and "not matched". The matched signal is generated when the two symbols compared are the same or one of the symbols is a variable. A flag means 48 having two alternative states monitors this output signal. The flag means 48 is set to the first or matched state when a comparison between the first query sequence symbol and the corresponding symbol in one of the data sequences is commenced. If any of the pair-wise comparisons between a query symbol and a data symbol from said data sequence fails to generate a matched output, the flag means 48 is set to the second or not matched state, which indicates that the data sequence in question did not correspond to the query sequence and the matching process is discontinued. If the flag means 48 is still set to the first state after the last query sequence symbol is compared to its corresponding data sequence symbol in the data sequence in question, it enables said data sequence to be readout by the receiving means 46.

An indicator advancing means 44 contained in the retrieving means 232 is used to control the first and second indicator means and to perform the various initialization operations. In this embodiment, the receipt of the last symbol in the query sequence is used to signal the start of the matching operations. The indicator advancing means sets the first indicator means 34 to indicate the first symbol in the first data sequence stored in the memory means 212 and the second indicator means 36 to indicate the first symbol of the query sequence. The indicator advancing means then initializes the flag means 48 to its first state and initiates the first comparison by signaling the comparing means 38. After each comparison is completed, the indicator advancing means 44 tests the flag means 48 to determine if it has been set to its second state indicating that the symbols did not match. If the flag means 48 is in its second state, the indicator advancing means advances the first indicating means 34 to the first symbol of the next data sequence, resets the second indicating means 36 to indicate the first symbol of the query sequence, resets the flag means 48 to its first state, and then signals for the indicated symbols to be compared.

If the flag means 48 indicates that the two symbols matched, the indicator advancing means 44 then tests to see if the last sequence in the query sequence has been compared to its corresponding data sequence symbol. If it has, the indicator advancing means 44 signals the receiving circuit 45 in receiving means 246 to read-out the data sequence in question. It then advances the first indicating means 34 to indicate the first symbol of the next data sequence, resets the second indicator means to indicate the first query sequence symbol, and signals the comparing means to commence.

If the last query symbol compared was not the last symbol in the query sequence, the indicator advancing means 44 advances the first indicating means 34 to indicate the data sequence symbol following the one just compared and the second indicator means 36 to indicate the next query sequence symbol following the one just compared, unless one of the symbols just compared was a variable and the other was an open delimiter. In this case, the indicator advancing means 44 advances the indicating means in the sequence having the variable to indicate the symbol following said variable, and it advances the indicating means in the sequence having the open delimiter to indicate the symbol following the closing delimiter corresponding to said open delimiter.

When the last data sequence symbol of the last data sequence stored in the memory means 212 has been compared by the comparing means 38, the indicating advancing means 44 enters a wait state until another query sequence is sent to the receiving means 46.

The indicator advancing means 44 may also copy data sequences from the receiving means into the memory means 212. In the preferred embodiment this is signaled by a preselected symbol which precedes the data sequence in question. Embodiments in which this function is signalled by a signal on one or more of the bus lines 47 will be obvious to those skilled in the art.

The choice of memory means and retrieving means will, in general, depend on the speed and storage density requirements of the data processing system to which the apparatus of the present invention is coupled. In principle, the data sequences can be stored in any of a number of different physical memory devices as described below. In the preferred embodiment, parallel processing is utilized to reduce the time needed to retrieve the stored data sequences. To accomplish this, the retrieving means 32 is implemented with a number of retrieving processors for comparing a query symbol with a data sequence symbol. The time needed to search the stored data sequences for those that correspond to a particular query sequence will depend on the speed and number of said retrieving processors. A system in which the ratio of processors to memory locations is large will retrieve the corresponding data sequences in the least amount of time, the shortest retrieval time being obtained with one processor per stored data sequence having sufficient speed to assure that each data sequence symbol to be compared with a given query sequence symbol is available to the corresponding retrieving processor when said query sequence symbol is coupled to the apparatus of the present invention. This system will have a lower memory density and higher cost per stored data symbol than systems with fewer retrieving processors in which the circuitry that would have been used to construct the additional retrieving processors is used to construct additional memory slots. Hence there is a tradeoff between speed and cost per data symbol stored.

The possible memory devices for storing the data sequences can be divided into two broad classes, static and circulating storage devices. Standard random access memory chips used in computer memories are typical of the static storage devices. Rotating storage devices such as magnetic and optical disks and shift register storage loops are typical of the circulating storage devices. The type of storage device used determines the optimum mode in which the query sequence is compared to the data sequences.

If a static storage system is used for the data sequences, a matching system in which the query sequence "circulates" past the data sequences is optimum. Here, each symbol of the query sequence is compared to the corresponding symbol in each of the stored data sequences. When all the comparisons involving a given query sequence symbol are completed, the next query sequence symbol is then compared with each of the corresponding symbols in the stored data sequences, and so on. A flag must be associated with each of the data sequences to keep track of all the data sequences which are still possible matches with said query sequence at each stage of the comparison operation. The flag is set at the beginning of the retrieval operation. If one of the pair-wise matches fails, the flag associated with the data sequence containing the symbol that failed to match is reset. Those data sequences which are still marked by a flag in its initial state after the last query sequence symbol has been compared to its corresponding symbols in the stored sequences are then coupled to the external data processing system to which the apparatus of the present invention is connected.

This embodiment requires only that the query sequence symbol currently being used in the pair-wise comparisons be stored in the apparatus of the present invention. Hence it is applicable to searches involving query sequences of arbitrary length. Since a variable in a data sequence may match a very long sub-sequence in the query sequence it is not possible to determine in advance the longest query sequence which may be encountered even if one knows the maximum length of the data sequences which are to be stored in the apparatus.

An embodiment of the present invention employing a static memory system for the storage of the data sequences and multiple processors for carrying out the comparisons is shown at 80 in FIG. 4. Here, the memory means 12 shown in FIG. 1 has been implemented as a plurality of separate static memories 92. Each static memory 92 consists of a contiguous black of slots 144. Each slot 144 is used to store one data sequence symbol in the manner described above in reference to FIG. 3. Each of the static memories 92 is connected to a separate retrieving processor 94 which contains a comparison circuit for making all the pair-wise comparisons between data sequence symbols stored in said static memory and a query symbol coupled to the apparatus of the present invention on the bus 86. In the preferred version of this embodiment, this query symbol is held in a buffer 82 constructed from a block of one bit storage cells similar to that employed in the slots 144 used for storing data sequence symbols. The receiving means 84 loads the buffer 82 from the communication bus 86 connecting the present invention to an external data processing system. The individual retrieving processors 94 communicate with each other and the receiving means 84 over a second bus 98. The contents of the buffer 82 are communicated to each of the retrieving processors 94 over a query bus 99. Embodiments in which the buffer 82 is contained in the external data processing system coupled to the apparatus of the present invention will be obvious to those skilled in the art.

Figure 5:
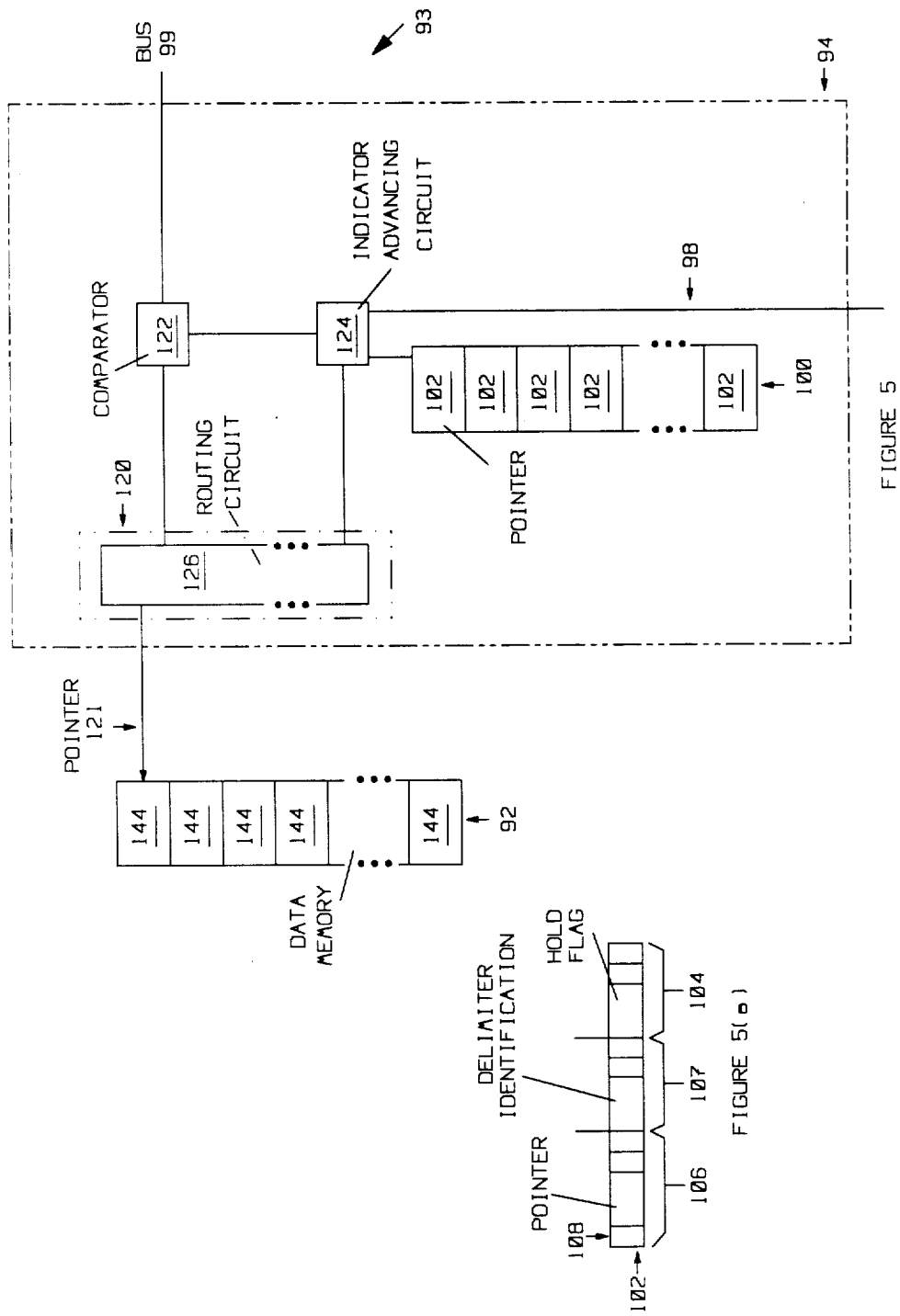
FIGS. 5, and 5(*a*) illustrate a more block diagram of the retrieving processors shown in FIG. 4.

A more detailed schematic diagram of an exemplary retrieving processor 94 and its associated static memory 92 is shown at 93 in FIG. 5. Each retrieving processor 94 contains a comparison means 122 for comparing a data sequence symbol stored in the static memory 92 coupled to the retrieving processor 94 with the query symbol communicated on the query bus 99. The data sequence symbol to be compared with said query symbol is identified by an indicator means 120 which includes a routing circuit 126 for coupling said data sequence symbol to the comparison means 122 and a pointer 121. Said indicator means 120 is under the control of an indicator advancing means 124.

Since this embodiment operates by comparing a given query symbol with each of the corresponding symbols in each of the stored data sequences before proceeding to comparisons involving the next query symbol, a separate pointer means must be maintained for each data sequence which indicates the next data sequence symbol in that data sequence which is to be compared to a query symbol. These pointers are stored in a separate pointer memory means 100 connected to the indicator advancing means 124. The pointer memory means 100 is divided into pointers 102, each consisting of three groups of one bit storage cells 108, as shown in FIG. 5(a).

Each pointer specifies a pair of symbols to be compared by this comparing means 122, one symbol from the query sequence and one symbol from a data sequence stored in the static memory 92 coupled to said comparing means 122. The pointer group 106 indicates the location of the next data sequence symbol to be compared in one of the data sequences having symbols stored in the static memory 92 connected to the indicator advancing means 124 in question. The second group consists of a hold flag 104 having one of two alternative states, "hold" and "ready". The hold state indicates that the query symbol to be compared to the data sequence symbol whose location is indicated in the first group 106 is not yet on the query bus 99. The third group 107 is used to store information needed to identify a closing query sequence delimiter which corresponds to a given query sequence open delimiter.

The second indicator means 36 and second routing circuit 42 shown in the embodiment in FIG. 3 are not needed in this embodiment. The hold flag 104 and third group 107 serve the same function as the second indicator means 36 served in the embodiment shown in FIG. 3; i.e., they identify the next query sequence symbol to be used in a pair-wise comparison. Since only one query symbol is available at any given time, only a two state device is needed to indicate whether the current query symbol or some yet to be received query symbol is the one to be compared. The second routing circuit 42 is not needed in this embodiment. In the embodiment shown in FIG. 4, this routing function is performed by the external data processing system which provides the query sequence to the apparatus of the present invention one symbol at a time.

As each query sequence symbol is coupled to the retrieving processor 94 on the query bus 99, the indicator advancing means 124 cycles through the pointers 102 in its associated pointer memory means 100. For each pointer 102 having its associated hold flag 104 in the ready state, the indicator advancing means 124 causes the comparing means 122 to compare the data sequence symbol identified by the pointer group 106 of said pointer 102 with the query sequence symbol on the query bus 99. If the comparing means 122 generates an output signal indicating that the data sequence symbol in question corresponded to said query symbol, the indicator advancing means 124 changes the pointer group 106 associated with the data sequence in question so as to identify the next data sequence symbol in said data sequence which is to be used in a pair-wise comparison with a query symbol. The comparing means 122 generates said output signal indicating that the data sequence symbol in question corresponded to said query symbol if the two symbols were identical or if one of said symbols was a variable.

If a variable data sequence symbol is compared to an open delimiter query sequence symbol of the query bus 99, the indicator advancing means sets the hold flag 104 contained in the pointer 102 which specified the variable data sequence symbol in question and stores the data needed to recognize the corresponding closing delimiter in the third group 107 of said pointer 102. When the indicator advancing means encounters a hold flag 104 in the hold state, it examines the query symbol currently on the query bus 99 to determine if it is the closing delimiter corresponding the open delimiter which caused said hold flag 104 to be set to said hold state. If it is, then the indicator advancing means resets said hold flag 104 to the ready state.

If a data sequence symbol indicated by one of said pointers 102 fails to result in the generation of an output from said comparing means 122 indicating that said symbol corresponded to the query sequence symbol with which it was compared, the pointer group 106 in the pointer 102 in question is set to a predetermined value which indicates that this pointer no longer functions to specify a data sequence symbol. If all such indicators are set to this preselected state, then no data sequences corresponding to the query sequence are present in the apparatus and a special output signal is communicated on the communications bus 86 to the external processor coupled to the apparatus of the present invention. This allows said external data processor to abort the query sequence to save processing time.

If a particular data sequence occupies storage slots 144 in more than one static memory 92, than the indicator advancing means 124 in one retrieving processor 94 will signal the adjacent indicator advancing means 124 over the bus 98 when the next comparison to be made using a symbol from said data sequence involves a symbol stored in a slot 144 in the adjacent static memory 92. Said adjacent indicator advancing means 124 then assigns a pointer 102 in its pointer memory block 100 to said data sequence.

After the last query symbol is communicated on said query bus and compared to its corresponding data sequence symbols, any data sequences which passed all the pair-wise comparison as indicated by the pointers 102 in the retrieving processors are then read out to the external data processing system on communication bus 86. These will be the data sequences in which the cast symbol of the data sequence was compared to the last symbol of this query sequence.

The degree of parallel processing which is possible depends on the number of retrieving processors 94. Since only one data sequence symbol from each stored data sequence is compared to a given query symbol, the highest degree of parallel processing would be achieved with one retrieving processor 94 per stored data sequence.

If a circulating memory storage system is used for the data sequences, the query sequence may remain static, and the data sequences are matched against it as each data sequence "streams" by the query sequence. An embodiment of the present invention employing a circulating memory is shown at 50 in FIG. 6. The data sequences are stored in a memory loop 52 containing a plurality of slots 314, each slot providing storage for one data sequence symbol. The slots may be constructed from a block of one bit storage cells in a manner similar to the slots in the embodiment shown in FIG. 3, each slot being divided into an identification group and a data group which serve the same functions as corresponding groups in that embodiment. The data stored in the memory loop 52 circulates past a tap point 54 at which it is available for coupling to a comparison means 238 and for reading and writing by the indicator advancing means 244. In this embodiment, the functions of the first indicator means 34 shown in FIG. 3 are performed by a hold flag 56 having one of two alternate states, "hold" and "ready", which indicates whether or not the data sequence symbol currently coupled to the comparing means 238 is to be compared to the query symbol identified by the indicator means 236. If the hold flag is in the hold state, the comparing means 238 is inhibited from comparing the data sequence symbol currently at the tap point 54. The indicator advancing means 244 sets the hold flag to the ready state when the first query symbol of the query sequence is compared to the first symbol of a data sequence. The hold flag 56 is set to the hold state when a variable query sequence symbol is compared to an open delimiter. The hold flag 56 is reset to the ready state when the closing delimiter corresponding to the open delimiter which caused said hold flag 56 to be set to hold state is read by the indicator advancing means 244 at the tap point 54.

The query sequence symbol to be used in each comparison is specified by an indicator means 236. The indicator means 236 is under the control of the indicator advancing means 244. It contains a routing circuit 242 for coupling the specified query symbol to the comparing means 238 and a printer 237 for identifying a slot in a query storage memory means 222 wherein the query sequence is stored.

A flag means 248 is used to flag data sequences in which all the pair-wise comparisons between data sequence symbols contained in one of said sequences and query symbols from said query sequence resulted in a matched output signal from the comparing means 238 which functions in the same manner as the comparing means 38 shown in FIG. 3. Such flagged sequences are read out through the receiving means 246 after the last query sequence symbol is compared to the last data sequence symbol in the data sequence in question.

In contrast to the static memory system shown in FIG. 4, this embodiment requires that the apparatus of the present invention provide storage for the entire query sequence, not just the current symbol being searched in that sequence. The query sequence is stored in query storage memory means 222, as mentioned above, which is part of the receiving means 246. This memory is organized into slots with the same structure as those described with reference to the query storage memory means 22 in the embodiment shown in FIG. 3. The requirement that the entire query sequence be contained in the apparatus of the present invention places some limitations on the length of the query sequence which may be searched. This is not a serious limitation, however, since one can usually make an estimate of the longest query sequence which is likely to be used. Alternatively, the query sequence may be divided into a number of smaller sequences and a means can be incorporated for loading a second query sequence without resetting the apparatus and then continuing the matching process.

Figure 6:
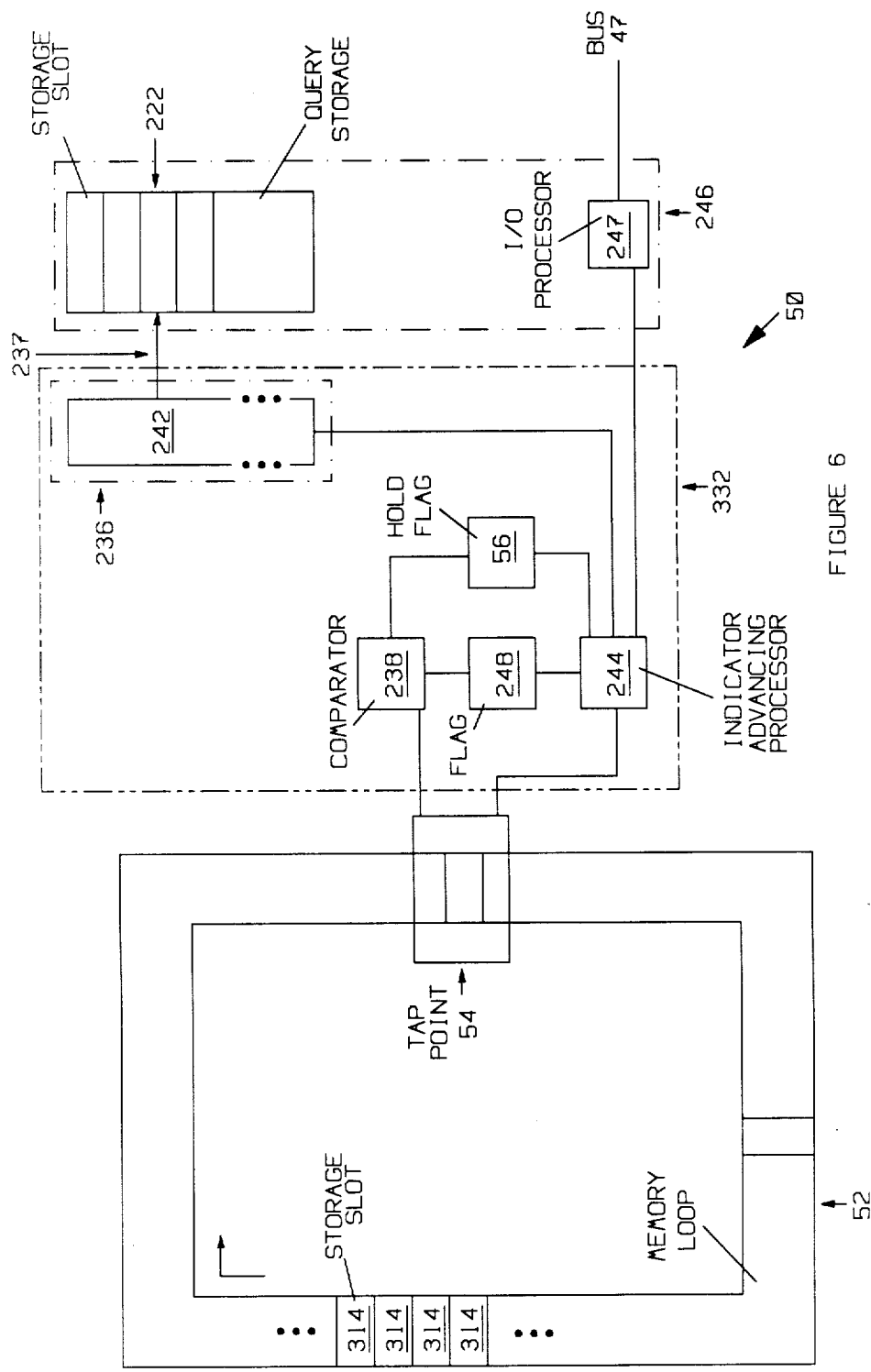
FIG. 6 is a block diagram of a third embodiment of the present invention.

The query sequence is loaded into the apparatus of the present invention shown in FIG. 6 by sending a special preselected query symbol to the receiving means 246 followed by the query sequence in question. The receipt of the end of the query sequence which is signaled by the closing delimiter corresponding to the opening delimiter marking the beginning of the query sequence is used to signal the start the matching processes. Upon receiving this signal, the indicator advancing means 244 sets the various flags to their initial states in a manner analogous to that used by the indicator advancing means 44 shown in the embodiment shown in FIG. 3, the second indicator means 236 to indicated the first symbol of the query sequence, and then waits for the first symbol of a data sequence to be read at the tap point. When said first symbol is present, the matching process begins in a manner analogous to the embodiment of the present invention described in FIG. 3.

In both the static and circulating embodiments of the present invention, the retrieving means 232 and 332, respectively may be constructed from standard microprocessor chips. Alternatively, a special purpose processor may be constructed using methods well known to those skilled in the art of VLSI circuit design. This processor may also be implemented on the same VSLI chip as the first and second memory means.

The choice of which of the above described embodiments is optimum for a given system will in general depend upon the storage density and comparison speed requirements of the system desired. A static system similar to that described in FIGS. 4 and 5 in which there is one retrieval processor 94 with each data storage data sequence would provide the shortest possible search time. Such a system could compare each symbol of the query sequence with its corresponding symbol in each of the stored data sequences in a single comparison cycle. However, since the "chip space" needed to construct the retrieving processors exceeds the chip space needed to construct a slot used for storing a symbol, and since the potential number of data sequences is large, this type of memory would have a very low density of memory cells and hence a high cost per symbol stored.

A system based on a circulating memory with a static storage buffer for the query sequence offers a higher density of storage, and often lower cost. Rotating storage media such as magnetic disk are capable of storing data at a per word cost that is much less than that obtained using standard random access memory chips. Optical disks have the potential for providing higher storage densities than integrated circuit memories, also at a fraction of the cost per symbol stored. However, these devices are inherently slower than the static data sequence storage system discussed above, since they must wait for the desired data symbol to pass by the tap point. This requirement sets the time needed to complete a search in the circulating memory embodiment of the present invention. If a particular data sequence fails to correspond to the query sequence, the retrieving means must still wait for the entire data sequence to pass the tap point. Hence the time to perform a search is the time required for the entire contents of the memory loop to pass the tap point.

In contrast, the maximum time needed to perform a search in the static memory embodiment of the present invention employing one retrieving processor containing one comparison circuit per stored data sequence is the time need to read the query sequence. In the static memory embodiment, if all of the data sequences failed early in the pair-wise comparison process, this result could be immediately output and the next search started without waiting for the entire query sequence to be received.

The speed limitations of circulating storage systems can be overcome to some degree by employing several reading stations in parallel. Each station views the data as it passes a different tap point in the circulation loop. Each of these tap points would contain a separate retrieving processor with access to the query sequence. Hence the time needed to read the entire memory would be reduced by a factor equal to the number of tap points.

Although the present invention is primarily intended for use in artificial intelligence systems, it may be used without an external data processing system. For example, a system consisting of a keyboard and a display terminal would be sufficient to operate the apparatus of the present invention. In this simple system, the data sequences could be in the form of a fixed library stored in read only memories. The entries in this library would be selected by typing the symbols specifying the pertinent query sequence. The retrieving processor would be programmed to respond to certain command keys for controlling the flow of information to and from the apparatus.

While various embodiments of the invention have been described herein, it will be appreciated that various changes and modifications may be made without departing from the scope of the present invention as claimed.

What is claimed is:

1. A memory system for the storage and retrieval of one or more data sequences of symbols comprising:

memory means for storing one or more said data sequences of symbols, said symbols including constants, variables, and delimiters;

means for receiving a query sequence of symbols coupled to said memory system, said symbols including constants, variables, and delimiters;

means for retrieving each data sequence of symbols from said memory means corresponding to said query sequence of symbols, a data sequence of symbols being defined as corresponding to said query sequence of symbols if the two sequences can be made identical by replacing each variable by a constant or combination of constants and delimiters, said combination beginning and ending with a delimiter, said retrieving means including means for comparing said query sequence of symbols to each data sequence of symbols stored in said memory means;

wherein said means for retrieving each data sequence of symbols from said memory means corresponding to said query sequence of symbols comprises:

first indicator means for identifying a data sequence symbol;

second indicator means for identifying a query sequence symbol;

comparing means for comparing the data sequence symbol identifed by said first indicating means with the query sequence symbol identified by said second indicator means and for generating an output signal having one of two alternative states, a matched state indicating that the two symbols compared were the same or that at least one of said symbols was a variable, and a not matched state indicating that the two symbols were different and neither was a variable;

flag means responsive to said comparing means output signal for indicating the generation of any output signal being in the not matched state;

indicator advancing means comprising means for causing said first indicator means to indicate the first symbol of a selected data sequence, said second indicator means to indicate the first symbol of said query sequence, and said comparing means to compare said identified symbols, and means for causing said first indicator means to identify a next data sequence symbol, said second indicator means to identify a next query sequence symbol, and said comparing means to compare said identified symbols until a termination condition is detected;

means for detecting said termination condition; and means responsive to said termination condition for outputting said selecting data sequence if said flag means indicates that none of said comparisons resulted in the generation of a not matched output signal.

2. The memory system of claim 1 further comprising means for causing a said data sequence of symbols coupled to said memory system to be stored in said memory means.

3. The memory system of claim 1 wherein said receiving means includes a query storage memory means for storing said query sequence of symbols.

4. The memory system of claim 1 wherein said termination condition is defined to occur when said comparing means compares the last symbol of said query sequence to a data sequence symbol.

5. The memory system of claim 1 wherein said termination condition is defined to occur when said comparing means compares the last symbol of said selected data sequence to a query sequence symbol.

6. The memory system of claim 1 wherein said termination condition is defined to occur when said comparing means compares the last symbol of said selected data sequence to the last symbol of said query sequence or an output signal in the not matched state is generated.

7. The memory system of claim 1 wherein said delimiters occur in corresponding pairs, an open delimiter being used to mark the beginning of a sequence of symbols or of a subsequence of symbols embedded in a sequence of symbols and the corresponding closing delimiter being used to mark the end of said sequence of symbols or subsequence of symbols, and said indicator advancing means includes means for determining the closing delimiter corresponding to a given open delimiter in said selected data sequence or said query sequence, and said next data sequence symbol and said next query sequence symbol caused to be identified by said indicator advancing means are the next sequential data sequence symbol after the one previously compared by said comparing means and the next sequential query symbol following the one previously compared by said comparing means unless said previously compared symbols were a variable and an open delimiter, in which case, said next symbols are the symbol following said said variable and the symbol following the closing delimiter corresponding to said open delimiter.

8. The memory system of claim 7 wherein said means for determining which closing delimiter corresponds to a given open delimiter comprises means for storing a label with each said delimiter, said label being the same for each said delimiter of a corresponding pair of delimiters and said label not being repeated in any other pair of delimiters within the sequence or subsequence of symbols marked by said pair of delimiters.

9. The memory system of claim 7 wherein said means for determining which closing delimiter corresponds to a given open delimiter comprises means for storing as part of each open delimiter the location of its corresponding closing delimiter in the sequence of symbols containing said open delimiter.

10. The memory system of claim 7 wherein said means for determining which closing delimiter corresponds to a given open delimiter in a sequence of symbols comprises means for counting delimiters, wherein said counting means is initialized to a predetermined initial state when said second indicator means indicates the first symbol of said query sequence of symbols, said counting means is incremented each time an open delimiter is encountered in a sequence of symbols and said counting means is decremented by an equal amount each time a closing delimiter is encountered in said sequence of symbols, said corresponding closing delimiter being the one causing said counting means to return to its initial state.

11. The memory system of claim 7 wherein said memory means comprises a plurality of slots, each said slot being used to store one symbol and comprising a block of contiguous one bit storage cells, and wherein said slot is divided into two groups, an identification group and a data group, said identification group consisting of at least two one bit storage cells for identifying the type of symbol stored in said slot and said data group comprising the remainder of said one bit storage cells.

12. The memory system of claim 11 wherein said means for determining which closing delimiter corresponds to each open delimiter includes means in a slot whose identification group indicates that said slot is storing an open delimiter, for storing data in the data group which indicates the identity of the closing delimiter corresponding to said open delimiter.

13. A memory system for the storage and retrieval of one or more data sequences of symbols comprising:
   memory means for storing one or more said data sequences of symbols, said symbols including constants, variables, and delimiters;
   means for receiving a query sequence of syumbols coupled to said memory system, said symbols including constants, variables, and delimiters;
   means for retrieving each data sequence of symbols from said memory means corresponding to said query sequence of symbols, a data sequence of symbols being defined as corresponding to said query sequence of symbols if the two sequences can be made identical by replacing each variable by a constant or combination of constants and delimiters, said combination beginning and ending with a delimiter, said retrieving means including means for comparing said query sequence of symbols to ach data sequence of symbols stored in said memory means;
   wherein said delimiters occur in corresponding pairs, an open delimiter being used to mark the beginning of a sequence of symbols or of a sub-sequence of symbols embedded in a sequence of symbols and the corresponding closing delimiter being used to mark the end of said sequence of sub-sequence of symbols,
   said retrieving means comprises:
      means for identifying the closing delimiter corresponding to a given open delimiter;
      means for specifiying corresponding pairs of symbols, one symbol from said query sequence and one symbol from one of said data sequences;
      means for comparing each specified corresponding pair of symbols, said comparing means generating an output signal having two states, a matched output signal indicating that the symbols compared were the same or at least one of said symbols was a variable and a not matched output state indicating that the symbols did not match and neither of said symbols was a variable;
   indicator advancing means comprising:
      means for causing said specifying means to initially specify as a first corresponding pair of symbols the first symbol of each data sequence and the first symbol of said query sequence said comparing means operating in response thereto compare said first corresponding pair of symbols;
      means for causing said specifying means to successively specify a subsequent corresponding pair of symbols, composed of a next data sequence symbol and a next query sequence symbol each time said comparing means generates matched output signal and neither of the symbols compared was the last symbol of a data sequence of the last symbol of said query sequence, said comparing means operating in response thereto compare such said subsequent corresponding pair of symbols, wherein said next data sequence symbol is the adjacent data symbol following the one previously compared by said comparing means and said next query sequence symbol is the adjacent query sequence symbol following the one previously compared by said comparing means unless the previous comparison was between a variable and an open delimiter, in which case the next symbols to be specified are the adjacent symbol following said variable and the adjacent symbol following the closing delimiter corresponding to said open delimiter;
      means for reading out each data sequence for which the last symbol of said data sequence was compared to the last symbol of said query sequence.

14. The memory system of claim 13 wherein said memory means comprises a plurality of contiguous blocks of slots, each said slot storing one data sequence symbol, and
   wherein said comparing means comprises a plurality of comparison circuits, one said comparison circuit being operatively connected to each said block, each said comparison circuit making the comparisons between the specified corresponding pairs of symbols which include a data sequence symbol in the block of slots operatively connected to said comparison circuit.

15. In a memory system having one or more data sequences of symbols stored therein wherein said data sequence symbols are defined to include symbols of three types, constants, variables, and delimiters, said delimiters being present in corresponding pairs, an open delimiter being used to mark the beginning of a sequence of symbols or subsequence of symbols embedded in a sequence of symbols and the corresponding closing delimiter being used to mark the end of said sequence or subsequence of symbols, a method for retrieving one of said data sequence of symbols which corresponds to a query sequence of symbols composed of the same three types of symbols as defined for said data sequence of symbols comprising the steps of
   (a) setting a flag to a first state;
   (b) indicating a first data sequence symbol in said data sequence of symbols;
   (c) indicating a first query sequence symbol in said query sequence of symbols;
   (d) comparing said symbols indicated in steps (b) and (c);
   (e) setting said flag to a second state indicating that said data sequence of symbols did not correspond to said query sequence of symbols if said symbols did not correspond, wherein said symbols are defined as corresponding if said data sequence symbol was identical to said query sequence symbol or if at least one of said symbols was a variable, and
   (f) indicating a next data sequence symbol and a next query sequence symbol, wherein said next data sequence symbol is the one following the previously indicated data sequence symbol in said data sequence of symbols and said next query sequence symbol is the one following the previously indicated query sequence symbol in said query sequence of symbols unless the previously indicated symbols were an open delimiter and a variable, in which case perform step (g);
   (g) determine the closing delimiter corresponding to said open delimiter; the next symbols to be so indicated are the one following said variable and the one following the closing delimiter corresponding to said open delimiter, (h) repeating of steps (b) through (h) until the last symbol in said query sequence for symbols have been compared; and (i) retrieving said data sequence if said flag is in said first state.

16. The method of claim 15 wherein the step of determining which closing delimiter corresponds to a given open delimiter in one of said data sequence of symbols or said query sequence of symbols includes the step of reading a label stored as a part of said open delimiter identifying the closing delimiter corresponding to said open delimiter.

17. The method of claim 15 wherein the step of determining which closing delimiter corresponds to a given open delimiter in one of said data sequence of symbols or said query sequence of symbols includes the steps of:

setting a counter to an initial state when said open delimiter is compared to said variable and then incrementing said counter;

reading each successive symbol in the sequence containing said open delimiter;

incrementing said counter each time an open delimiter is read and decrementing said counter by an equal amount each time a closing delimiter is read; and identifying the closing delimiter which causes said counter to return to said initial state as said corresponding closing delimiter.

18. The method of claim 15 wherein the step of determining which closing delimiter corresponds to a given open delimiter in one of said data sequence of symbols or said query sequence of symbols includes reading data stored as a part of said open delimiter which specifies the location of said closing delimiter in the sequence containing said open delimiter.

* * * * *